(No Model.)
J. G. PONTEFRACT.
PROCESS OF AND APPARATUS FOR DISTILLATION.
No. 289,706. Patented Dec. 4, 1883.
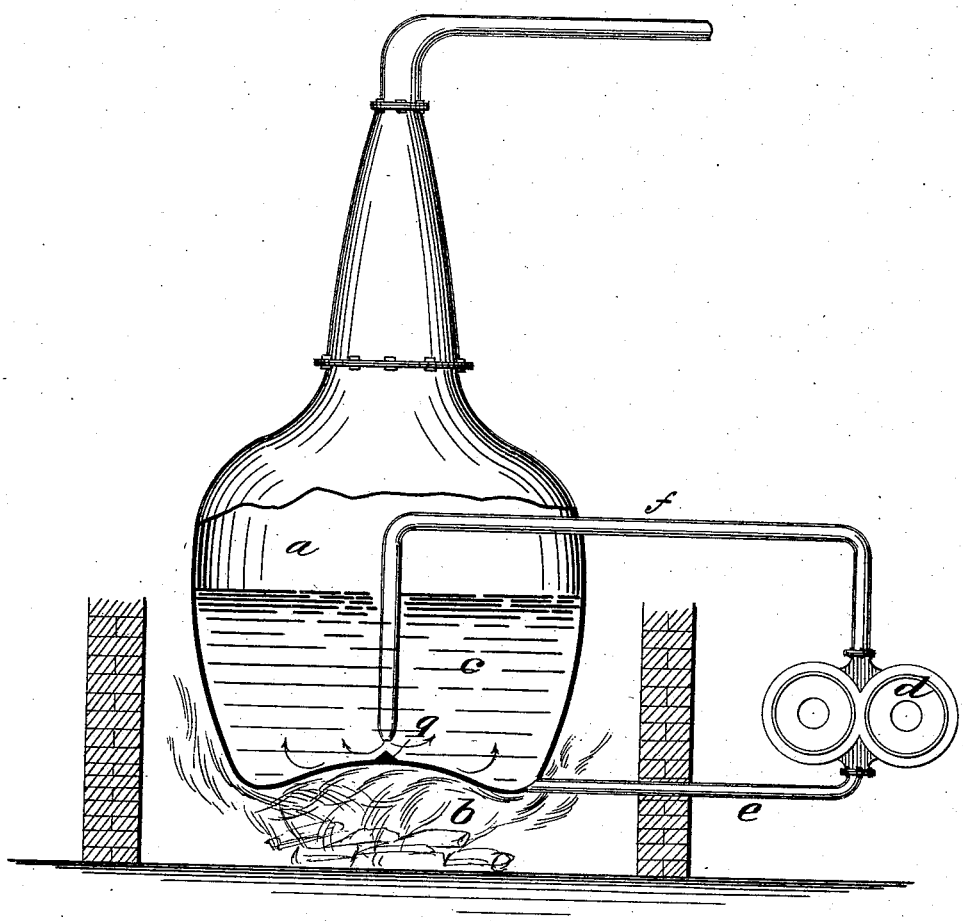
WITNESSES:
INVENTOR:
BY
ATTORNEYS.

UNITED STATES PATENT OFFICE.

JAMES G. PONTEFRACT, OF PITTSBURG, PENNSYLVANIA.

PROCESS OF AND APPARATUS FOR DISTILLATION.

SPECIFICATION forming part of Letters Patent No. 289,706, dated December 4, 1883.

Application filed October 15, 1883. (No model.)

*To all whom it may concern:*

Be it known that I, JAMES G. PONTEFRACT, of Pittsburg, in the county of Allegheny and State of Pennsylvania, have invented certain new and useful Improvements in Process of and Apparatus for Distillation, of which the following is a full, clear, and exact description.

My improvement is in stills for the distillation of alcoholic liquors by the application of heat from direct fire, steam-jacket, or steam-coil; and it consists in agitating the fermented mash, beer, or other material to be distilled during the process of distillation in such a manner as to prevent the lees or solid particles from adhering to the side or bottom of the still and burning or scorching them, which I accomplish by causing a stream of the liquid undergoing distillation to be constantly withdrawn and forcibly injected back into the still while in operation. This incoming current striking on the bottom of the still communicates a scouring and rolling motion to the liquid, which cleans the sides and bottom of the still and prevents settling. The method by which this circulating-current is produced is hereinafter fully described.

Reference is to be had to the accompanying drawing, forming a part of this specification, in which the figure is partly a side elevation and partly a sectional elevation of a still and side elevation of apparatus for producing the circulation.

$a$ represents a section of the still, which in this example is heated by direct fire $b$, but may be heated by a steam-jacket, steam-coil, or other approved means. $c$ represents the boiling beer or mash. $d$ is a rotary pump, or may be any other form of pump drawing the liquid from the still through the pipe $e$, and discharging the same back into the still through the pipe $f$, discharging at the point $g$, which is a cone under the nozzle of the pipe $f$, to divide the current and prevent wearing the still-bottom.

Having thus described my invention, I claim as new and desire to secure by Letters Patent—

1. The method of agitating the fermented mash, beer, or other material to be distilled during the process of distillation by causing a stream of the liquid undergoing distillation to be constantly withdrawn and forcibly injected back into the still while in operation, substantially as described.

2. The combination of a rotary or other pump, $d$, and suitable connecting-pipes, $e$, and $f$, with a still, $a$, said pipe $f$ entering the latter and extending down centrally within the still-chamber nearly to its bottom for causing a stream of liquid undergoing distillation to be constantly withdrawn and forcibly injected back into the still while in operation, substantially as described.

3. The combination of a rotary or other pump, suitable connecting-pipes, $e$ and $f$, and the cone $g$ with a still, $a$, for causing a stream of liquid undergoing distillation to be constantly withdrawn and forcibly injected back into the still and discharged on the cone $g$ while the still is in operation, said cone being to divide the stream and prevent wearing of the still-bottom, substantially as described.

JAMES G. PONTEFRACT.

Witnesses:
H. J. HANNA,
CHAS. F. CALHOUN.